(12) United States Patent  (10) Patent No.: US 8,634,308 B2
Vobbilisetty et al.  (45) Date of Patent: *Jan. 21, 2014

(54) PATH DETECTION IN TRILL NETWORKS

(75) Inventors: Suresh Vobbilisetty, San Jose, CA (US); Phanidhar Koganti, Sunnyvale, CA (US); Arun Mahajan, Palo Alto, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 12/950,968

(22) Filed: Nov. 19, 2010

(65) Prior Publication Data

US 2011/0299406 A1    Dec. 8, 2011

Related U.S. Application Data

(60) Provisional application No. 61/380,831, filed on Sep. 8, 2010, provisional application No. 61/350,830, filed on Jun. 2, 2010.

(51) Int. Cl.
*G01R 31/08* (2006.01)

(52) U.S. Cl.
USPC .......................... 370/248; 370/241.1; 370/249

(58) Field of Classification Search
USPC ......... 370/224, 241, 242, 244, 248, 249, 250, 370/252, 401; 709/224
See application file for complete search history.

(56) References Cited

U.S. PATENT DOCUMENTS

| 5,390,173 | A | 2/1995 | Spinney |
|---|---|---|---|
| 5,983,278 | A | 11/1999 | Chong |
| 6,041,042 | A | 3/2000 | Bussiere |
| 6,085,238 | A | 7/2000 | Yuasa |
| 6,185,241 | B1 | 2/2001 | Sun |
| 6,438,106 | B1 | 8/2002 | Pillar |
| 6,542,266 | B1 | 4/2003 | Phillips |
| 6,633,761 | B1 | 10/2003 | Singhal |

(Continued)

FOREIGN PATENT DOCUMENTS

| EP | 2001167 A1 | 8/2007 |
|---|---|---|
| EP | 1916807 A2 | 10/2007 |
| WO | 2010111142 A1 | 9/2010 |

OTHER PUBLICATIONS

Christensen, M. et al., "Considerations for Internet Group Management Protocol (IGMP) and Multicast Listener Discovery (MLD) Snooping Switches", May 2006.

(Continued)

*Primary Examiner* — Awet Haile
(74) *Attorney, Agent, or Firm* — Shun Yao; Park, Vaughan, Fleming & Dowler LLP

(57) ABSTRACT

One embodiment of the present invention provides a system for detecting a path between two nodes. During operation, the system transmits a network-testing request frame, which includes a time-to-live (TTL) field within a Transparent Interconnection of Lots of Links (TRILL) header, from a source node to a destination node. In response to receiving a network-testing response frame sent from an intermediate node, the system increments the TTL value by 1 and re-transmits the network-testing frame to the destination node. In response to receiving a network-testing response frame sent from the destination node, the system determines a path between the source node and the destination node. The network-testing request or response frames is not processed on an Internet Protocol (IP) layer.

31 Claims, 12 Drawing Sheets

(56) References Cited

U.S. PATENT DOCUMENTS

| | | |
|---|---|---|
| 6,873,602 B1 | 3/2005 | Ambe |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,330,897 B2 | 2/2008 | Baldwin |
| 7,380,025 B1 | 5/2008 | Riggins |
| 7,477,894 B1 | 1/2009 | Sinha |
| 7,508,757 B2 | 3/2009 | Ge |
| 7,558,195 B1 | 7/2009 | Kuo |
| 7,558,273 B1 | 7/2009 | Grosser, Jr. |
| 7,599,901 B2 | 10/2009 | Mital |
| 7,690,040 B2 | 3/2010 | Frattura |
| 7,716,370 B1 | 5/2010 | Devarapalli |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homechaudhuri |
| 7,836,332 B2 | 11/2010 | Hara |
| 7,843,907 B1 | 11/2010 | Abou-Emara |
| 7,860,097 B1 | 12/2010 | Lovett |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,078,704 B2 | 12/2011 | Lee |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,301,686 B1 | 10/2012 | Appajodu |
| 8,351,352 B1 | 1/2013 | Eastlake, III |
| 8,369,335 B2 | 2/2013 | Jha |
| 8,369,347 B2 | 2/2013 | Xiong |
| 8,462,774 B2 | 6/2013 | Page |
| 2002/0021701 A1 | 2/2002 | Lavian |
| 2002/0091795 A1 | 7/2002 | Yip |
| 2003/0041085 A1 | 2/2003 | Sato |
| 2003/0189905 A1 | 10/2003 | Lee |
| 2004/0001433 A1 | 1/2004 | Gram |
| 2004/0117508 A1 | 6/2004 | Shimizu |
| 2004/0120326 A1 | 6/2004 | Yoon |
| 2004/0165595 A1* | 8/2004 | Holmgren et al. .......... 370/395.3 |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0169188 A1* | 8/2005 | Cometto et al. ............... 370/249 |
| 2005/0195813 A1 | 9/2005 | Ambe |
| 2005/0265356 A1 | 12/2005 | Kawarai |
| 2005/0278565 A1 | 12/2005 | Frattura |
| 2006/0018302 A1 | 1/2006 | Ivaldi |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0251067 A1 | 11/2006 | DeSanti |
| 2006/0265515 A1 | 11/2006 | Shiga |
| 2007/0036178 A1 | 2/2007 | Hares |
| 2007/0097968 A1 | 5/2007 | Du |
| 2007/0116224 A1 | 5/2007 | Burke |
| 2007/0177597 A1 | 8/2007 | Ju |
| 2007/0274234 A1 | 11/2007 | Kubota |
| 2008/0052487 A1 | 2/2008 | Akahane |
| 2008/0065760 A1* | 3/2008 | Damm et al. .................. 709/224 |
| 2008/0080517 A1 | 4/2008 | Roy |
| 2008/0101386 A1 | 5/2008 | Gray |
| 2008/0133760 A1* | 6/2008 | Berkvens et al. ............. 709/228 |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0186981 A1 | 8/2008 | Seto |
| 2008/0205377 A1 | 8/2008 | Chao |
| 2008/0219172 A1 | 9/2008 | Mohan |
| 2008/0225853 A1 | 9/2008 | Melman |
| 2008/0267179 A1 | 10/2008 | LaVigne |
| 2008/0285555 A1 | 11/2008 | Ogasahara |
| 2008/0298248 A1 | 12/2008 | Roeck |
| 2009/0037607 A1 | 2/2009 | Farinacci |
| 2009/0044270 A1 | 2/2009 | Shelly |
| 2009/0067422 A1 | 3/2009 | Poppe |
| 2009/0080345 A1 | 3/2009 | Gray |
| 2009/0083445 A1 | 3/2009 | Ganga |
| 2009/0092043 A1 | 4/2009 | Lapuh |
| 2009/0106405 A1 | 4/2009 | Mazarick |
| 2009/0199177 A1 | 8/2009 | Edwards |
| 2009/0204965 A1 | 8/2009 | Tanaka |
| 2009/0245137 A1 | 10/2009 | Hares |
| 2009/0245242 A1 | 10/2009 | Carlson |
| 2009/0260083 A1 | 10/2009 | Szeto |
| 2009/0323708 A1 | 12/2009 | Ihle |
| 2009/0327392 A1 | 12/2009 | Tripathi |
| 2009/0327462 A1 | 12/2009 | Adams |
| 2010/0054260 A1 | 3/2010 | Pandey |
| 2010/0061269 A1 | 3/2010 | Banerjee |
| 2010/0074175 A1 | 3/2010 | Banks |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0169467 A1 | 7/2010 | Shukla |
| 2010/0169948 A1 | 7/2010 | Budko |
| 2010/0226381 A1* | 9/2010 | Mehta et al. ................... 370/401 |
| 2010/0246388 A1 | 9/2010 | Gupta |
| 2010/0257263 A1 | 10/2010 | Casado |
| 2010/0271960 A1* | 10/2010 | Krygowski ................... 370/248 |
| 2010/0281106 A1* | 11/2010 | Ashwood-Smith ........... 709/203 |
| 2010/0284418 A1 | 11/2010 | Gray |
| 2010/0287548 A1 | 11/2010 | Zhou |
| 2010/0290473 A1 | 11/2010 | Enduri |
| 2010/0303071 A1 | 12/2010 | Kotalwar |
| 2010/0303083 A1 | 12/2010 | Belanger |
| 2010/0309820 A1 | 12/2010 | Rajagopalan |
| 2011/0019678 A1 | 1/2011 | Mehta |
| 2011/0035498 A1 | 2/2011 | Shah |
| 2011/0044339 A1 | 2/2011 | Kotalwar |
| 2011/0064086 A1 | 3/2011 | Xiong |
| 2011/0085560 A1 | 4/2011 | Chawla |
| 2011/0085563 A1 | 4/2011 | Kotha |
| 2011/0134925 A1 | 6/2011 | Safrai |
| 2011/0142053 A1 | 6/2011 | Van Der Merwe |
| 2011/0142062 A1* | 6/2011 | Wang et al. ................... 370/401 |
| 2011/0161695 A1 | 6/2011 | Okita |
| 2011/0194403 A1* | 8/2011 | Sajassi et al. ................. 370/217 |
| 2011/0194563 A1 | 8/2011 | Shen |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |

(56) References Cited

U.S. PATENT DOCUMENTS

| | | |
|---|---|---|
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0274114 A1 | 11/2011 | Dhar |
| 2011/0296052 A1 | 12/2011 | Guo |
| 2011/0299391 A1 | 12/2011 | Vobbilisetty |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299536 A1 | 12/2011 | Cheng |
| 2012/0011240 A1 | 1/2012 | Hara |
| 2012/0014387 A1 | 1/2012 | Dunbar |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0099602 A1 | 4/2012 | Nagapudi |
| 2012/0131097 A1 | 5/2012 | Baykal |
| 2012/0163164 A1 | 6/2012 | Terry |

OTHER PUBLICATIONS

Perlman, Radia et al., "RBridges: Base Protocol Specification" <draft-ietf-trill-rbridge-protocol-16.txt>, Mar. 3, 2010.
Brocade Fabric OS (FOS) 6.2 Virtual Fabrics Feature Frequently Asked Questions, 2009.
Eastlake, Donald 3rd. et al., "RBridges: TRILL Header Options", <draft-ietf-trill-rbridge-options-00.txt>, Dec. 24, 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, Dec. 4, 2009.
Knight, S. et al., "Virtual Router Redundancy Protocol", Apr. 1998.
Switched Virtual Internetworking moves beyond bridges and routers, 8178 Data Communications 23(1994) September, No. 12.
Touch, J. et al., "Transparent Interconnection of Lots of Links (TRILL): Problem and Applicability Statement", May 2009.
Lapuh, Roger et al., "Split Multi-link Trunking (SMLT)", Oct. 2002.
Lapuh, Roger et al., "Split Multi-Link Trunking (SMLT) draft-lapuh-network-smlt-08", Jan. 2009.
Nadas, S. et al., "Virtual Router Redundancy Protocol (VRRP) Version 3 for IPv4 and IPv6", Mar. 2010.
Brocade Unveils "The Effortless Network", http://newsroom.brocade.com/press-releases/brocade-unveils-the-effortless-network--nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STX, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", Brocade white paper, http://community.brocade.com/docs/DOC-2954, Dec. 3, 2012.
Kreeger, L. et al., "Network Virtualization Overlay Control Protocol Requirements", Draft-kreeger-nvo3-overlay-cp-00, Jan. 30, 2012.
Knight, Paul et al., "Network based IP VPN Architecture using Virtual Routers", May 2003.
Louati, Wajdi et al., "Network-based virtual personal overlay networks using programmable virtual routers", IEEE Communications Magazine, Jul. 2005.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 3, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 5, 2012.
U.S. Appl. No. 12/725,249 Office Action dated Apr. 26, 2013.
U.S. Appl. No. 12/725,249 Office Action dated Sep. 12, 2012.
U.S. Appl. No. 13/092,877 Office Action dated Sep. 5, 2013.
U.S. Appl. No. 13/044,326 Office Action dated Oct. 2, 2013.

* cited by examiner

| Fields | Octets |
|---|---|
| Outer Ethernet Header | |
| Outer MAC DA | 6 |
| Outer MAC SA | 6 |
| Outer VLAN tag | 4 |
| Ethertype = TRILL | 2 |
| TRILL Header | |
| V \| R \| M \| OL \| HC | 2 |
| Egress RBridge Nickname | 2 |
| Ingress RBridge Nickname | 2 |
| Inner Ethernet Header | |
| Inner MAC DA | 6 |
| Inner MAC SA | 6 |
| Inner VLAN tag | 4 |
| Ethertype = TOAM | 2 |
| TRILL OAM | |
| TOAM Header | |
| Payload | Variable |
| Frame Check Sequence (FCS) | 4 |

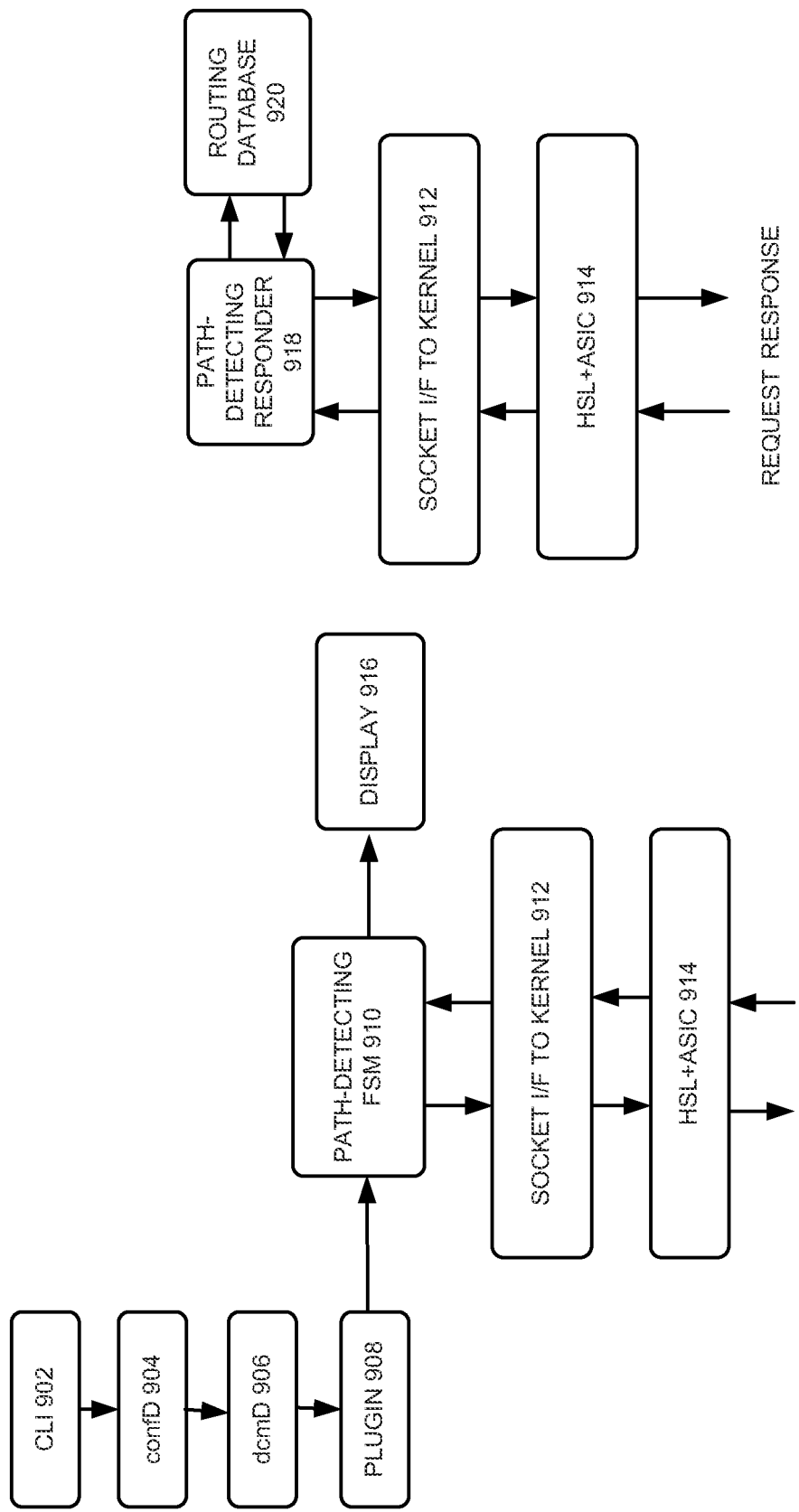

PATH DETECTION IN TRILL NETWORKS

RELATED APPLICATIONS

This application claims the benefit of U.S. Provisional Application No. 61/350,830, entitled "Path Detection in TRILL Networks," by inventors Suresh Vobbilisetty, Phanidhar Koganti, and Arun Mahajan, filed 2 Jun. 2010, and U.S. Provisional Application No. 61/380,831, entitled "Path Detection in TRILL Networks," by inventors Suresh Vobbilisetty, Phanidhar Koganti, and Arun Mahajan, filed 8 Sep. 2010, the disclosures of which are incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010;

U.S. patent application Ser. No. 12/730,749, entitled "METHOD AND SYSTEM FOR EXTENDING ROUTING DOMAIN TO NON-ROUTING END STATIONS," by inventors Pankaj K. Jha and Mitri Halabi, filed 24 Mar. 2010;

U.S. patent application Ser. No. 13/087,239, entitled "VIRTUAL CLUSTER SWITCHING," by inventors Suresh Vobbilisetty and Dilip Chatwani, filed 14 Apr. 2011; and U.S. patent application Ser. No. 12/950,974, entitled "REACHABILITY DETECTION IN TRILL NETWORKS," by inventors Suresh Vobbilisetty, Phanidhar Koganti, and Arun Mahajan, filed 19 Nov. 2010;

the disclosures of which are incorporated by reference herein.

BACKGROUND

1. Field

The present disclosure relates to network monitoring and troubleshooting. More specifically, the present disclosure relates to a method and apparatus for detecting a routing path in a network implementing the Transparent Interconnection of Lots of Links (TRILL) protocol.

2. Related Art

Conventional Ethernet bridges can transparently connect many physical links into what appears to Internet Protocol (IP) or other layer-3 protocol to be a single local area network (LAN). However, the spanning tree requirement of bridges can have substantial limitations. With spanning trees, the bandwidth across the LAN is limited because traffic flows over a subset of links forming a single tree or a small number of superimposed trees. On the other hand, IP routing requires that hosts be renumbered (be assigned a different IP address) when relocated in different network subnets, interrupting network and transport associations that are in progress during the transition.

The Transparent Interconnection of Lots of Links (TRILL) protocol combines the advantages of bridges and routers by running a link state protocol among the interconnected bridges, which are now called RBridges or routing bridges. Like any other type of network, a TRILL network needs to be monitored and maintained on a regular basis to ensure its proper operation. However, at present, TRILL networks lack many of the network control and management functions available in layer-3 networks.

SUMMARY

One embodiment of the present invention provides a system for detecting a path between two nodes. During operation, the system transmits a network-testing request frame, which includes a time-to-live (TTL) field within a Transparent Interconnection of Lots of Links (TRILL) header, from a source node to a destination node. In response to receiving a network-testing response frame sent from an intermediate node, the system increments the TTL value by 1 and re-transmits the network-testing frame to the destination node. In response to receiving a network-testing response frame sent from the destination node, the system determines a path between the source node and the destination node. The network-testing request or response frames is not processed on an Internet Protocol (IP) layer.

In a variation on this embodiment, the network-testing request or response frame includes an Ethernet frame.

In a further variation, the Ethernet frame includes a field which indicates that the Ethernet frame is an Operation, Administration, and Management (OAM) frame.

In a variation on this embodiment, the system further executes a network-testing command which includes an address of the destination node.

In a variation on this embodiment, the network-testing request or response frame is a TRILL frame.

In a further variation, the network-testing request or response frame includes TRILL headers comprising the address of the destination node in an outer media access control (MAC) destination address (DA) field.

In a further variation, the network-testing request or response frame includes TRILL headers and an encapsulated Ethernet frame, and the Ethertype field of the encapsulated Ethernet frame specifies that the network-testing request or response frame is a TRILL OAM frame.

In a further variation, the encapsulated Ethernet frame includes a TRILL OAM header field.

In a further variation, the TRILL OAM header field includes an operation code (opcode) field, and the opcode field specifies whether a TRILL OAM frame is a network-testing request or response frame.

In a further variation, the TRILL OAM header field includes a transaction identifier, and a network-testing request frame and a corresponding response frame have the same transaction identifier.

In a further variation, the TRILL OAM header field includes a flag field, and the flag field of the network-testing response frame can be encoded to indicate whether the response frame is sent from an intermediate node or the destination node.

In a variation on this embodiment, the network-testing response frame sent from the intermediate node includes route information to a next hop, and the route information includes an address and a port number of the next hop.

In a variation on this embodiment, the network-testing response or request frame is sent as a payload of an Internet Protocol (IP) packet or a Fibre Channel over Ethernet (FCoE) packet. The network-testing response or request frame includes an inner Ethernet MAC frame, and the Ethertype field within the inner Ethernet MAC frame is set as IP or FCoE.

In a further variation, the Ethertype field is set as IP, and the inner transport protocol can be transmission control protocol (TCP) or user datagram protocol (UDP). The TRILL OAM frame is the payload of the TCP or UDP frame.

In a further variation, the Ethertype field is set as FCoE, and the TRILL OAM frame is the payload of the FCoE frame

BRIEF DESCRIPTION OF THE FIGURES

FIG. 3 presents a diagram illustrating the format of an exemplary TRILL PDU used for Operations, Administration, and Maintenance (OAM) purposes in accordance with an embodiment of the present invention.

FIG. 9A presents a diagram illustrating the detailed flow of the path-detecting request and response packets within a TRILL network node that initializes the path-detecting operation in accordance with an embodiment of the present invention.

FIG. 9B presents a diagram illustrating the detailed flow of the path-detecting request and response packets within a TRILL network node that responds to the path-detecting request in accordance with an embodiment of the present invention.

In the figures, like reference numerals refer to the same figure elements.

DETAILED DESCRIPTION

Figure 1:
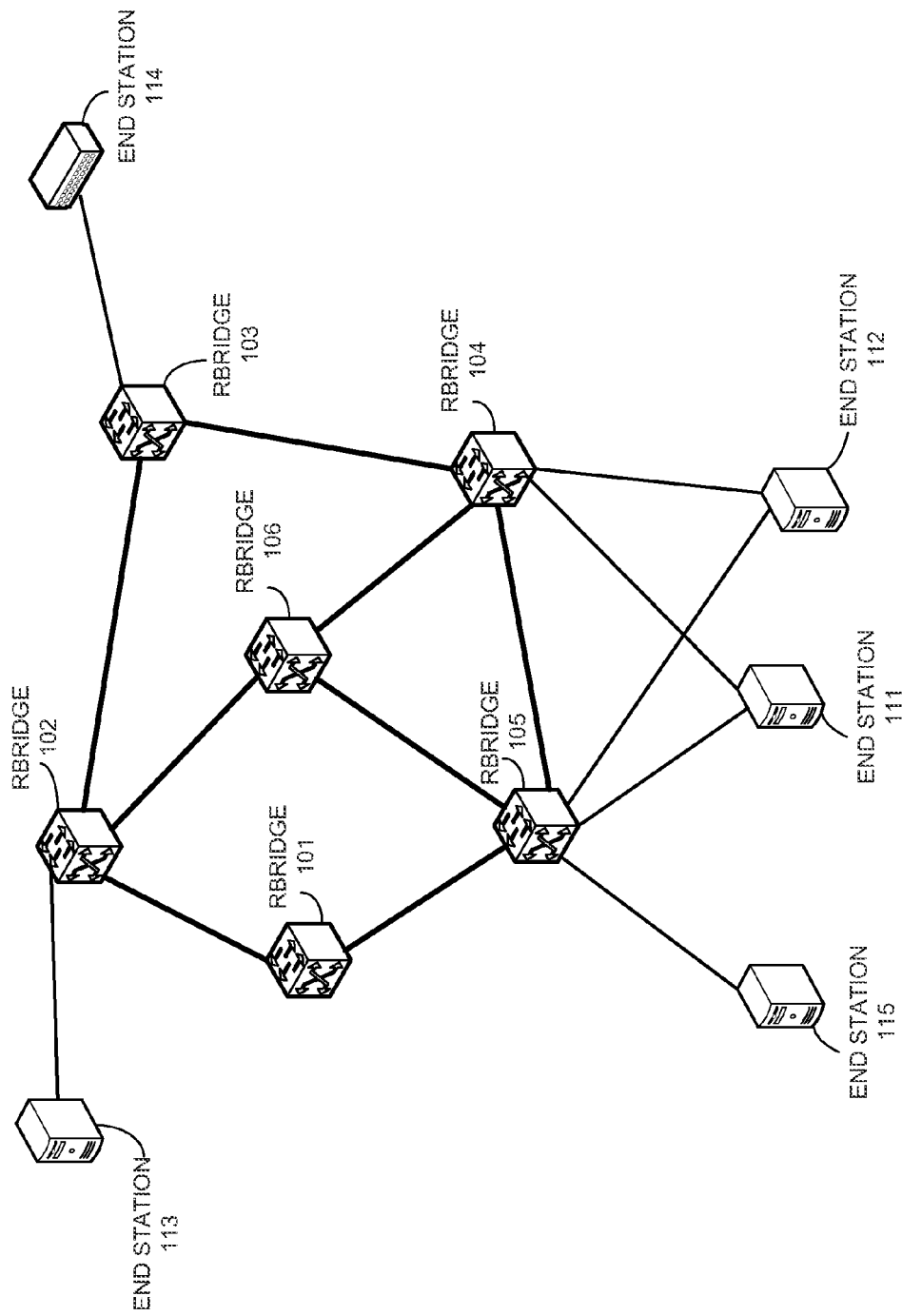
FIG. 1 illustrates an exemplary network based on the Transparent Interconnection of Lots of Links (TRILL) protocol (prior art).

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of route detection between TRILL nodes is solved by allowing a source node to send a number of path-detecting request packets to a destination node and determining whether corresponding response packets are received. During operation, the source node constructs a number of path-detecting request packets having incremental hop counts, and sequentially transmits these packets to the destination node. If an intermediate node receives a path-detecting request packet having the hop count set as 1, the intermediate node processes the packet, and sends a path-detecting response packet back to the source node. The path-detecting response packet includes information about the next hop, such as every possible node to which to forward the packet. Otherwise, the intermediate node forwards the packet to a next node in the route. The path-detecting request packet includes an optional source address, a destination address, and a transaction identifier which is incremented each time such a packet is sent. The transaction identifier can associate a response packet with a request packet. Each time the source node receives a response packet, it displays the address of the node from which the response is sent and the round trip time. In addition to providing all possible routes to the source node, an intermediate node can also provide the exact path that an actual data packet would take in order to get to the destination node by hashing the data payload included in the path-detecting request packets.

Although the present disclosure is presented using examples based on the TRILL protocol, embodiments of the present invention are not limited to TRILL networks, or networks defined in a particular Open System Interconnection reference model (OSI reference model) layer.

In this disclosure, the term "RBridge" refers to routing bridges, which are bridges implementing the TRILL protocol as described in IETF draft "RBridges: Base Protocol Specification," available at the IETF website (tools.ietf.org/html/draft-ietf-trill-rbridge-protocol-16), which is incorporated by reference herein. Embodiments of the present invention are not limited to application among RBridges. Other types of switches, routers, and forwarders can also be used.

The term "end station" refers to a network device that is not TRILL-capable. "End station" is a relative term with respect to the TRILL network. However, "end station" does not necessarily mean that the network device is an end host. An end station can be a host, a conventional layer-2 switch, an IP router, or any other type of network device. Additionally, an end station can be coupled to other switches, routers, or hosts further away from the TRILL network. In other words, an end station can be an aggregation point for a number of network devices to enter the TRILL network.

The term "dual-homed end station" refers to an end station that has an aggregate link to two or more TRILL RBridges, where the aggregate link includes multiple physical links to the different RBridges. The aggregate link, which includes multiple physical links, functions as one logical link to the end station. Although the term "dual" is used here, the term "dual-homed end station" does not limit the number of physical RBridges sharing the aggregate link to two. In various embodiments, other numbers of physical RBridges can share the same aggregate link. Where "dual-homed end station" is used in the present disclosure, the term "multi-homed end station" can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

OAM in TRILL Network

FIG. 1 illustrates an exemplary network based on the Transparent Interconnection of Lots of Links (TRILL) protocol (prior art). As illustrated in FIG. 1, a TRILL network includes six RBridges, 101, 102, 103, 104, 105, and 106. End station 113 is coupled to RBridge 102; end station 114 is coupled to RBridge 103; and end station 115 is coupled to RBridge 105. End stations 111 and 112 are both dual-homed and coupled to RBridges 104 and 105.

It is important to provide Operations, Administration, and Maintenance (OAM) services in a TRILL network. When a packet fails to reach its destination, the network administrator or a user may want to debug the network by attempting to determine the path the packet takes from a source node to a destination node. Such an operation may reveal which node in the network is at fault. However, unlike layer-3 (such as IP) networks for which a number of OAM protocols have been developed, there is no protocol available for implementing OAM in a TRILL network. To address this issue, embodiments of the present invention provide a method and apparatus for implementing OAM in a TRILL environment.

Figure 2:
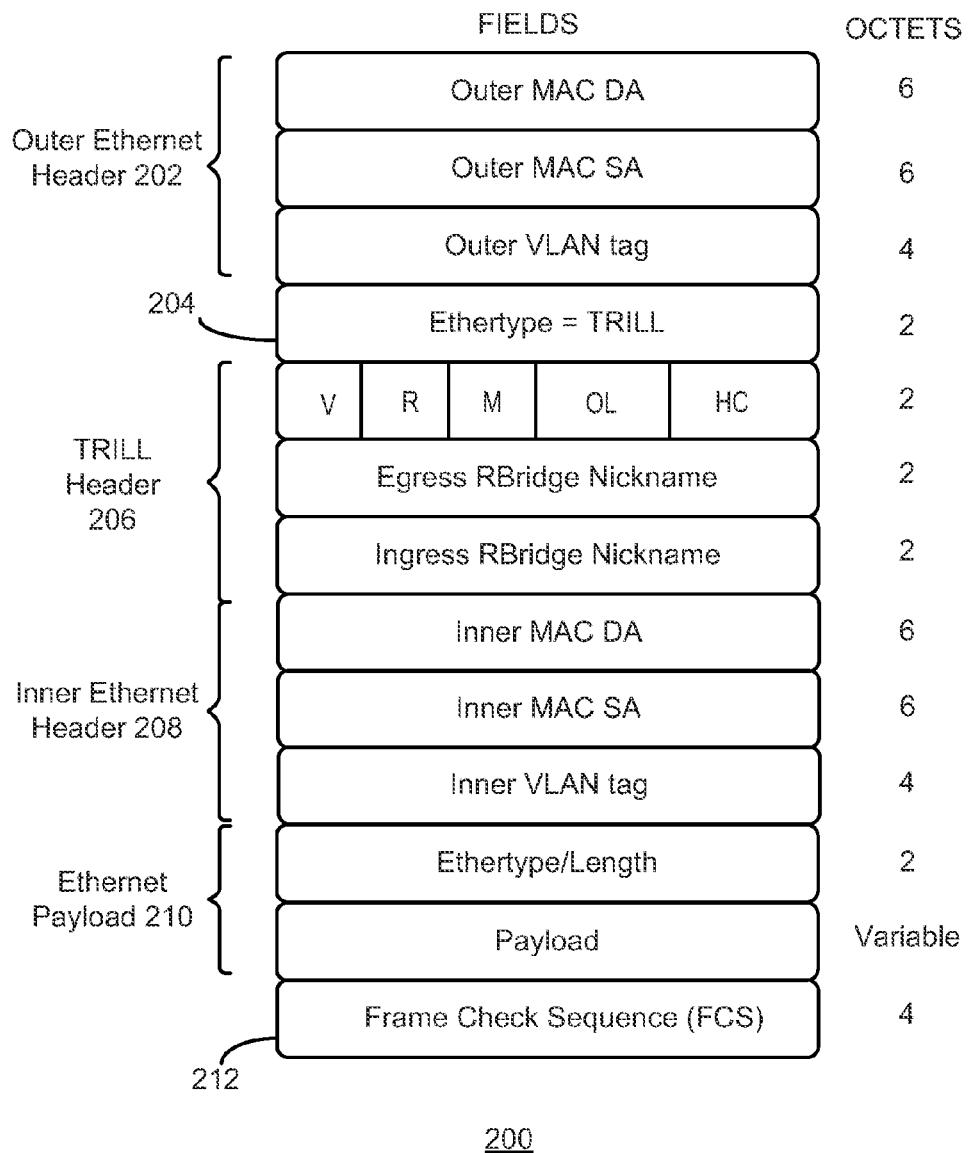
FIG. 2 presents a diagram illustrating the format of an exemplary protocol data unit (PDU) for the TRILL protocol (prior art).

Because each node (RBridge) runs the TRILL protocol on its ports to facilitate transport of frames (which can be Ethernet or other types of frames) within and across the network, an OAM packet exchanged between the nodes also needs to conform to the TRILL protocol. FIG. 2 presents a diagram illustrating the format of an exemplary protocol data unit (PDU) for the TRILL protocol (prior art). For Ethernet-based TRILL, PDU 200 is an encapsulated Ethernet frame that includes an outer Ethernet header 202, a 2-byte Ethertype field 204, a TRILL header 206, an inner Ethernet header 208, an Ethernet payload 210, and a 4-byte frame check sequence (FCS) field 212.

Outer Ethernet header 202 includes a 6-byte outer media access control (MAC) destination address (DA) field, a 6-byte outer MAC source address (SA) field, and a 4-byte outer virtual local area network (VLAN) tag field. The outer MAC DA field and the outer MAC SA field specify the next hop RBridge and the transmitting RBridge, respectively, and the outer VLAN tag includes an outer VLAN ID (specified by the designated RBridge for the link onto which the TRILL frame is being sent) and a priority field. Ethertype field 204 specifies that Ethertype is TRILL.

TRILL header 206 includes a 2-bit version (V) field, a 2-bit reserved (R) field, a 1-bit multi-destination (M) field, a 5-bit options length (OL) field, a 6-bit hop count (HC) field, a 2-byte egress RBridge nickname field, and a 2-byte ingress RBridge nickname field. The V field specifies the version of the TRILL-encapsulated frame. If an RBridge determines that the V field in a received TRILL frame has an unrecognized value, the RBridge can optionally discard that frame. The multi-destination field indicates whether the frame is to be delivered to a class of destination end stations via a distribution tree. The OL field specifies the length of an optional field, which indicates optional capabilities used by the TRILL frame, in units of 4 octets. If OL is zero, there are no options present. Otherwise, the options follow immediately after the ingress RBridge nickname field. The hop count field specifies the number of hops a TRILL frame has experienced. An RBridge decrements the hop count of a received frame, and drops frames received with a hop count of zero. The value of the egress RBridge nickname field depends on the value of the M field. If M=0, the frame is a unicast frame, and the egress RBridge nickname field specifies the egress RBridge. If M=1, the frame is a multi-destination frame, and the egress RBridge nickname field contains a nickname specifying the distribution tree selected to be used to forward the frame. The ingress RBridge nickname is set to a nickname of the ingress RBridge for TRILL data frame and to a nickname of the source RBridge for TRILL end state address distribution information (ESADI) frame.

Inner Ethernet header 208 includes a 6-byte inner MAC DA field, a 6-byte inner MAC SA field, and a 4-byte inner VLAN tag field. The inner MAC DA field and inner MAC SA field specify the destination and source, respectively, of the inner frame, and the inner VLAN tag field contains the VLAN tag information associated with the native frame when it was ingressed.

Ethernet payload 210 includes a 2-byte Ethertype/length field specifying the Ethertype of the original payload, and a variable-length original Ethernet payload field. FCS field 212 contains the computed FCS of the TRILL frame, which is used to detect frame corruptions due to bit errors on a link. Note that the FCS normally changes on encapsulation, decapsulation, and every TRILL hop due to changes in the outer DA and SA addresses and the decrement of the hop count.

To implement OAM in a TRILL network, embodiments of the present invention provide TRILL OAM packets that can be exchanged between two network nodes, thus allowing a system administrator to check on continuity and connectivity, and to measure the performance of the network. For example, in order to detect a possible route between two nodes within a TRILL network, a number of OAM packets can be generated and transmitted from a node with a specified source MAC address to a node with a specified destination MAC address. Along the route, each intermediate node sends a response packet to the source node. The receipt of response packets from all intermediate nodes and the destination node facilitates the mapping of possible route from the source node to the destination node. Note that, although such an operation is similar to a traceroute operation used in an Internet Protocol (IP) network, an IP traceroute cannot be used in the TRILL environment because the IP traceroute relies on the Internet Control Message Protocol (ICMP) time exceeded packet to be sent each time a packet with a time-to-live (TTL) value of 1 is received, and ICMP is not compatible with TRILL. Furthermore, an IP traceroute command can only detect paths on the IP layer, which does not always reflect the path taken on the TRILL layer.

FIG. 3 presents a diagram illustrating the format of an exemplary TRILL PDU used for Operations, Administration, and Maintenance (OAM) purposes in accordance with an embodiment of the present invention. TRILL-OAM (TOAM) PDU 300 contains fields common to a TRILL PDU, including the outer Ethernet header, the TRILL header, the inner Ethernet header, and the FCS. In addition, the Ethertype/length field of the Ethernet payload within TRILL-OAM PDU 300 is set as TOAM to specify that the TRILL PDU is a TRILL-OAM PDU. The OAM-specific information is carried in the original Ethernet payload field, which includes a TOAM header field and a payload field.

Figure 4A:
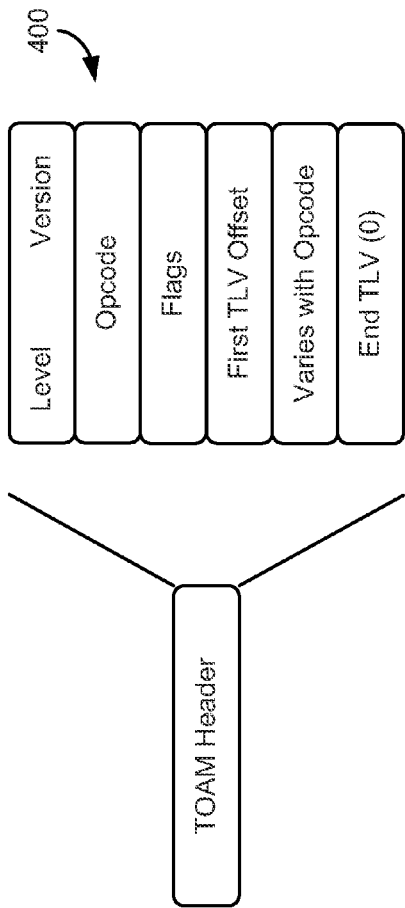
FIG. 4A presents a diagram illustrating the details of the TRILL OAM (TOAM) header in accordance with an embodiment of the present invention.

In one embodiment, the TRILL-OAM PDU can be sent as a payload of an IP packet or an FCoE packet. In such cases, the outer Ethernet MAC header and the TRILL header remain the same as shown in FIG. 3. The inner Ethernet MAC header is also kept similar, except that the Ethertype field for the inner header is set as IP or FCoE, accordingly. If the inner Ethertype field is set as IP, it indicates that the inner transport protocol is either user datagram protocol (UDP) or transmission control protocol (TCP), and the TRILL-OAM frame is then the payload of a UDP or TCP frame. If the inner Ethertype field is set as FCoE, then the TRILL-OAM frame is the payload of the FCoE frame FIG. 4A presents a diagram illustrating the details of the TOAM header in accordance with an embodiment of the present invention. The first octet of TOAM header 400 includes information regarding level and version, with the higher 3 bits of the first octet dedicated to the level and the lower 5 bits of the first octet dedicated to the version. The second octet of TOAM header 400 specifies the operation code (opcode) of the current TOAM PDU. The third octet of TOAM header 400 is the flags field, which is used by certain types of TOAM PDUs as specified by the opcode. The fourth octet of TOAM header 400 specifies the offset of the first type-length-value (TLV) field, in units of octets. The length of the next field varies with the opcode. In one embodiment, the next field also includes possible TLV fields. TOAM header 400 also includes an end TLV with its type set as 0, indicating the end of TOAM header 400.

As mentioned previously, to detect a possible route between two nodes, the system can transmit a number of path-detecting request packets having incremental hop counts from a source node to a destination node, and wait for path-detecting response packets returned from intermediate nodes and the destination node. In one embodiment, both the request and response packets are TRILL-OAM packets, which are distinguishable from each other by the opcode.

Figure 4C:
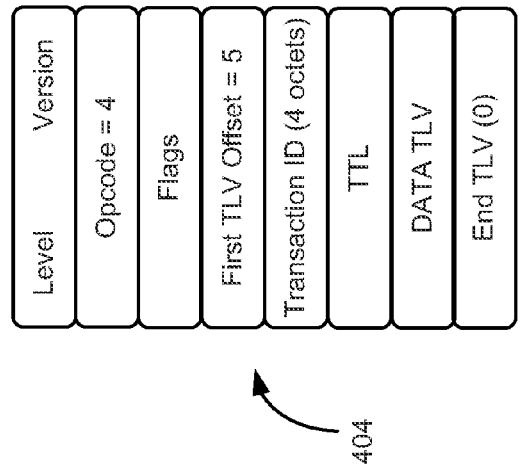
FIG. 4C presents a diagram illustrating the TOAM header of an exemplary path-detecting response packet in accordance with an embodiment of the present invention.
Figure 4B:
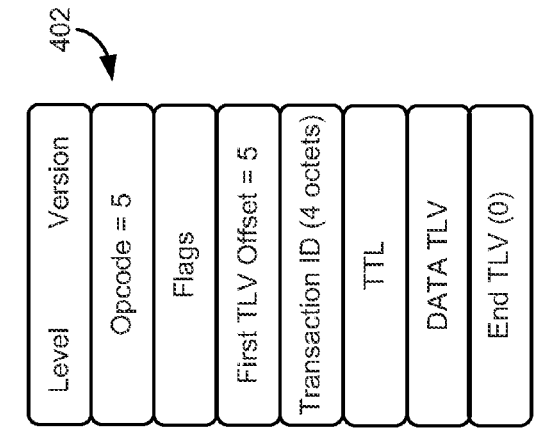
FIG. 4B presents a diagram illustrating the TOAM header of an exemplary path-detecting request packet in accordance with an embodiment of the present invention.
Figure 4E:
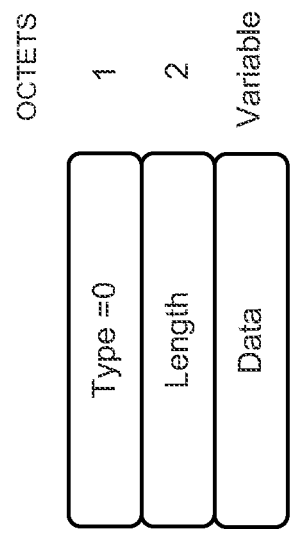
FIG. 4E presents a diagram illustrating an exemplary end type-length-value (TLV) in accordance with an embodiment of the present invention.
Figure 4D:
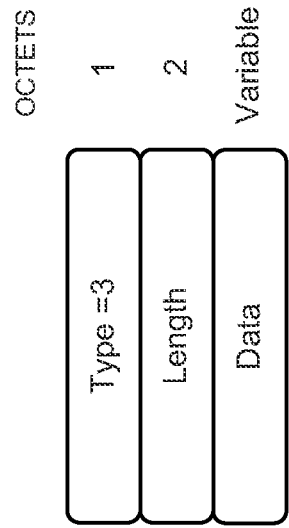
FIG. 4D presents a diagram illustrating an exemplary data type-length-value (TLV) in accordance with an embodiment of the present invention.

FIG. 4B presents a diagram illustrating the TOAM header of an exemplary path-detecting request packet in accordance with an embodiment of the present invention. TOAM header 402 includes common TOAM header fields, such as the level/version field, the opcode field, flags, the first TLV offset field, and the end TLV. Note that the opcode is set as 5, indicating this TOAM packet is a path-detecting request packet. The first TLV offset is set as 5, indicating that the beginning of the first TLV starts 5 bytes after this field. Between the first TLV offset field and the first TLV is a 4-byte transaction identifier (ID) field and a 1-byte TTL field. The transaction ID increments each time a path-detecting request packet is sent, and can be used to associate a response with a request. The TTL field is similar to the hop count (HC) field in the TRILL header. Each time the packet passes a node, the TTL value is decremented by one. A number of TLVs including data TLVs and the end TLV follow after the TTL field. FIG. 4D presents a diagram illustrating an exemplary data TLV in accordance with an embodiment of the present invention. The type value of data TLV 410 is set as 3. FIG. 4E presents a diagram illustrating an exemplary end TLV in accordance with an embodiment of the present invention. The type value of the end TLV 420 is set as 0.

Bits 2 and 3 of flags field in TOAM header 402 are encoded to indicate whether the current path-detecting request is a plain path request, a path request with data, or a path discovery request. A 00 encoding of bits 2 and 3 of the flags field indicates the path request is a plain path request, 01 indicates a path request with data, and 10 indicates a path discovery request. Depending on the request type, a receiving node transmits different responses as explained in more detail later.

FIG. 4C presents a diagram illustrating the TOAM header of an exemplary path-detecting response packet in accordance with an embodiment of the present invention. Similar to TOAM header 402, TOAM header 404 includes common TOAM header fields, a 4-byte transaction ID field, TTL field, and data TLVs. Note that the opcode is set as 4, indicating this TOAM packet is a path-detecting response packet. The transaction ID of a response packet is the same as that of the associated request packet. The flags field is encoded to indicate whether a route is available from the current node onward to the destination node. If no route is available (i.e., current node is at fault), bit 7 of the flags field is set as 0. Otherwise, it is set as 1. In addition, bit 6 of the flags field is encoded to indicate whether the current node is the destination node. If the current node is the destination node, bit 6 of the flags field is set as 1; otherwise, it is set as 0.

Data TLVs include route information reported by the responding node. Depending on the request type (plain, with data, or discovery), an intermediate node can construct different response packets with different data TLVs. If the path-detecting request is a plain request (as indicted by the flag field), the intermediate node responds to the request packet with the path (the next node) to which it would have forwarded the packet based on the inner MAC DA. The route will be in the form of {RBridge, slot/port} with RBridge and slot/port being two separate 32-bit entities identifying the MAC address and port number of the next hop RBridge. In cases where equal cost multiple-path (ECMP) paths exist, information for one of the paths will be input into the data TLV of the path-detecting response packet.

If the received path-detecting request is a request with data (as indicated by the flags field), the intermediate node responds to the request with the exact path that a network data packet would have taken to the destination. To do so, the logic of the intermediate node will use information contained in the data payload to generate a hash, which can be used to compare with the routing table in order to get the exact route to the destination. In one embodiment, the logic of the intermediate node hashes the 7-tuple flow identifier {source MAC address, destination MAC address, source IP address, destination IP address, VLAN ID, source port, destination port} to obtain the exact route. The computed exact route is inserted into the data TLV in the response packet. The route will be in the form of {RBridge, slot/port} with RBridge and slot/port being two separate 32-bit entities identifying the MAC address and port number of the next hop RBridge.

If the received path-detecting request is a discovery request (as indicated by the flags field), the intermediate node responds to the request with all possible ECMP paths from the source to the destination. Upon receiving a path discovery request, the intermediate node gets all the ECMP routes based on the inner MAC DA from its ASIC, and packs these ECMP routes into the data TLV fields of the response packet. Each route will be in the form of {RBridge, slot/port, flag} with RBridge and slot/port being two separate 32-bit entities, and flag being an 8-bit entity. Similar to the flags field in the TOAM header, the flag field in the data TLV can be used to indicate whether a particular route is routable. If a route can be used to forward the packet, bit 7 of the flag field will be set as 1; otherwise, it is set as 0. Note that, because more than one route can be included in the data TLV, a flag per route is needed.

Figure 5:
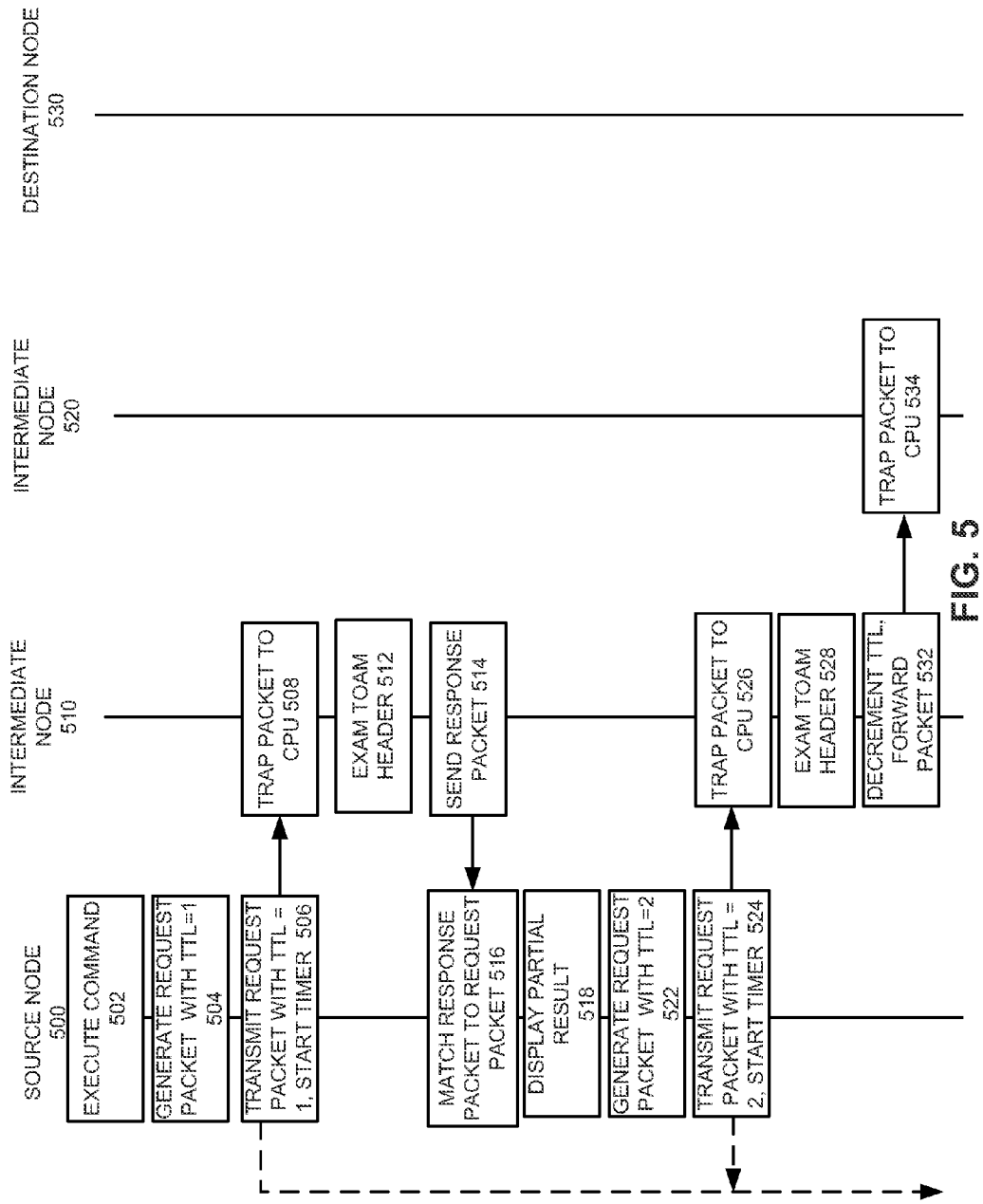
FIG. 5 presents a time-space diagram illustrating an exemplary process of route detection between a source node and a destination node in accordance with an embodiment of the present invention.
Figure 5:
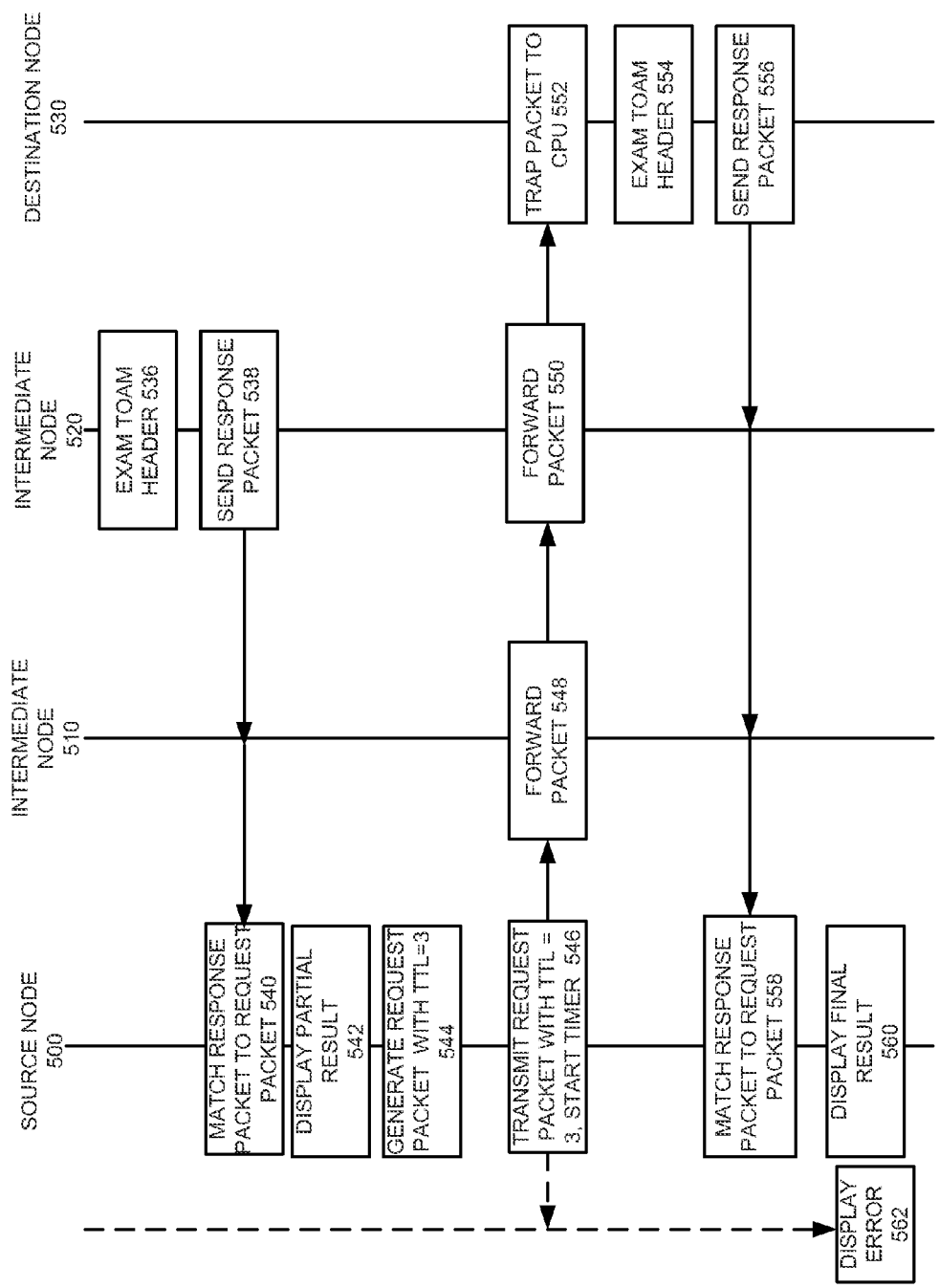

FIG. 5 presents a time-space diagram illustrating an exemplary process of route detection between a source node and a destination node in accordance with an embodiment of the present invention. During operation, source node 500 executes a path-detecting request command (operation 502). In one embodiment, an operator command, such as a command line interface (CLI) command, is executed. In a further embodiment, the command line for the path-detecting request has the following format: 12traceroute plain|with_data|discovery <options>. Selection of plain|with_data|discovery indicates whether the path-detecting request is a plain request, a request with data, or a discovery request.

For a plain request, the command can have the following format: 12traceroute plain {--src_mac <src_mac>}-dst_mac <dst_mac> vlan <vlan>ingress_port <ingress_port> --m <max_ttl> --t <wait_time>. Src_mac specifies the MAC address of the source node, which is optional. If the source MAC address is specified, it has to be either a MAC address that has been learned by the node or the node's own MAC address. If the source MAC address is not specified, then the system will use the node's own MAC address when constructing the path-detecting request packet. The dst_mac specifies the MAC address of the destination node. The vlan specifies the VLAN ID, and the ingress_port specifies the ingress port number. The max_ttl specifies the maximum hops that the path-detecting process will probe, and the wait_time specifies, in seconds, the time the system will wait for a response. Note that the inclusion of the source MAC address allows a user to detect route between two remote nodes.

Upon executing the path-detecting request command, source node 500 generates a path-detecting request packet (operation 504). The outer MAC DA of the request packet is set as the MAC address of destination node 530, and the HC field (TTL) in the TRILL header is set as 1. In addition, the inner MAC SA is set as the MAC address of source node 500, the inner MAC DA is set as the MAC address of destination node 530, and the TTL field in the TOAM header is also set as 1. Subsequently, source node 500 transmits the request packet and starts a timer (operation 506).

The path-detecting request packet arrives at intermediate node 510, which traps the packet to its processor (operation 508). In one embodiment, intermediate node 510 traps a received packet to its processor if the Ethertype field contained in the packet payload indicates the packet is a TRILL OAM packet. In a further embodiment, intermediate node 510 traps a received packet to its processor if the HC field in the TRILL header has a value of 1. Intermediate node 510 examines the TOAM header (operation 512). In response to the TTL value being 1, which means the packet cannot be forwarded further, intermediate node 510 constructs a path-detecting response packet and sends it back to source node 500 (operation 514). The path-detecting response packet includes the MAC address and port number of the next hop, to which intermediate node 510 would forward the packet to the destination node. The outer MAC DA of the response packet is now set as the MAC address of source node 500.

Source node 500 receives the response packet and matches it to an outstanding request based on the transaction ID (operation 516). Based on the data TLV contained in the response packet, source node 500 displays the route (operation 518).

By examining the flag field contained in the response packet, source node 500 determines that the response is not sent by the destination node but by an intermediate node, and consequently generates a path-detecting request packet with its TTL field in the TOAM header set as 2 (operation 522). Similar to the previously sent request packet, the outer MAC DA of the current path-detecting packet is set as the MAC address of destination node 530, the inner MAC SA is set as the MAC address of source node 500, and the inner MAC DA is set as the MAC address of destination node 530. Subsequently, source node 500 transmits the request packet and starts a timer (operation 524).

The path-detecting request packet arrives at intermediate node 510, which traps the packet to its processor (operation 526). Intermediate node 510 exams the TOAM header and determines that the packet is not for itself because the TTL value is greater than 1 (operation 528). As a result, intermediate node 510 decrements the TTL value and forwards the packet to intermediate node 520 (operation 532).

The path-detecting request packet then arrives at intermediate node 520, which traps the packet to its processor based on the Ethertype field in the payload being TOAM (operation 534). Intermediate node 5200 examines the TOAM header (operation 536). In response to the TTL value now being 1, which means the packet cannot be forwarded further, intermediate node 520 constructs a path-detecting response packet and sends it back to source node 500 (operation 538). The path-detecting response packet includes the MAC address and port number of the next hop, to which intermediate node 520 would forward the packet. In this example, the next hop is destination node 530. The outer MAC DA of the response packet is now set as the MAC address of source node 500.

Source node 500 receives the response packet and matches it to an outstanding request based on the transaction ID (operation 540). Based on the data TLV contained in the response packet, source node 500 displays the route (operation 542).

By examining the flag field contained in the response packet, source node 500 determines that the response is not sent by the destination node but by an intermediate node, and consequently generates a path-detecting request packet with its TTL field in TOAM header set as 3 (operation 544). Similar to the previously sent request packets, the outer MAC DA of the current path-detecting packet is set as the MAC address of destination node 530, the inner MAC SA is set as the MAC address of source node 500, and the inner MAC DA is set as the MAC address of destination node 530. Subsequently, source node 500 transmits the request packet and starts a timer (operation 546).

The path-detecting request packet subsequently arrives at intermediate nodes 510 and 520, which in turn decrement the TTL and forward the packet to the next hop (operation 548 and operation 550). The HC field in the TRILL header is set as 1 before the packet is forwarded to destination node 530.

The path-detecting request packet then arrives at destination node 530, which traps the packet to its processor based on the HC field in the TRILL header being set as 1 (operation 552). Destination node 530 examines the TOAM header (operation 554). In response to the TTL value now being 1, which means the packet cannot be forwarded further, destination node 530 constructs a path-detecting response packet and sends it back to source node 500 (operation 556). The outer MAC DA of the response packet is now set as the MAC address of source node 500. The flag field in the response packet is set to indicate that the sending node is the destination node.

Source node 500 receives the response packet, matches it to an outstanding request based on the transaction ID (operation 558), and displays the result (operation 560). Note that, if a timer expires before the corresponding response packet is received by source node 500, source node 500 will terminate the path-detecting operation and display an error message indicating that a response has not been received within the time window specified by the predetermined timer value (operation 562).

Figure 6:
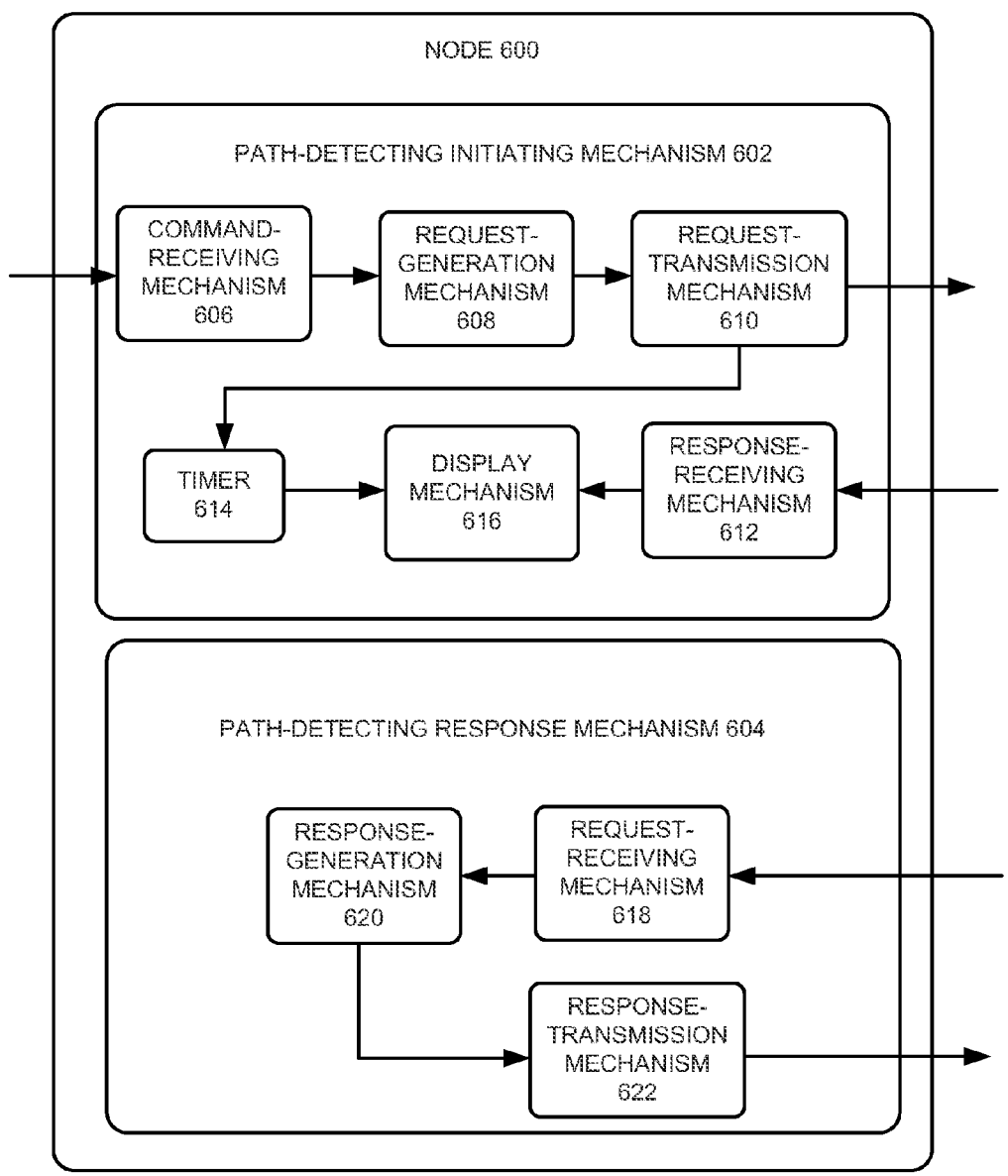
FIG. 6 presents a diagram illustrating the architecture of an exemplary TRILL network node enabling the path-detecting operation in accordance with an embodiment of the present invention.

FIG. 6 presents a diagram illustrating the architecture of an exemplary TRILL network node enabling the path-detecting operation in accordance with an embodiment of the present invention. TRILL network node 600 includes a path-detecting initiating mechanism 602 configured to initiate a path-detecting operation, and a path-detecting response mechanism 604 configured to respond to the path-detecting request. Path-detecting initiating mechanism 602 includes a command-receiving mechanism 606, a request-generation mechanism 608, a request-transmission mechanism 610, a response-receiving mechanism 612, a timer 614, and a display mechanism 616. Path-detecting response mechanism 604 includes a request-receiving mechanism 618, a response-generation mechanism 620, and a response-transmission mechanism 622.

During operation, command-receiving mechanism 606 receives a path-detecting command, which can be from a remote host. Upon receiving the command, request-generation mechanism 608 generates a path-detecting request packet with TTL value set as 1 using parameters specified by the command. Request-transmission mechanism 610 transmits the request packet toward the destination node and starts timer 614. If timer 614 expires before a corresponding response packet is received by response-receiving mechanism 612, an error message is displayed by display mechanism 616. If a valid response is received by response-receiving mechanism 612, then display mechanism 616 will display the arrival of the response packet along with the round trip time statistics. Based on the received response packet, request-generation mechanism 608 may generate more request packets with incremented TTL values.

Request-receiving mechanism 618 is configured to receive a path-detecting request packet, and response-generation mechanism 620 is configured to generate a path-detecting response packet upon receiving a request packet. The response packet includes route information inserted into the data TLV field. Response-transmission mechanism 622 is configured to transmit a path-detecting response packet back to the source node.

Packet Flow Option 1

Figure 7B:
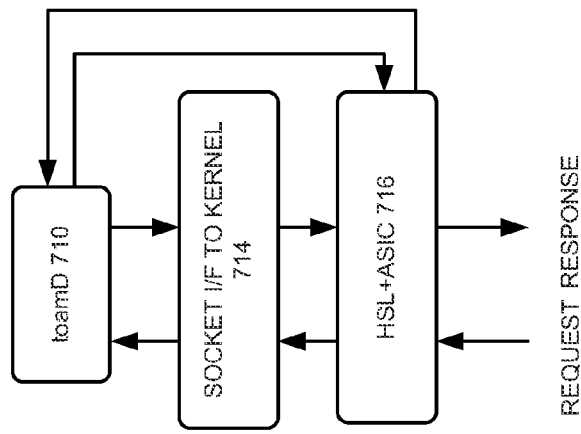
FIG. 7B presents a diagram illustrating the detailed flow of the path-detecting request and response packets within a TRILL network node that responds to the path-detecting request in accordance with an embodiment of the present invention.
Figure 7A:
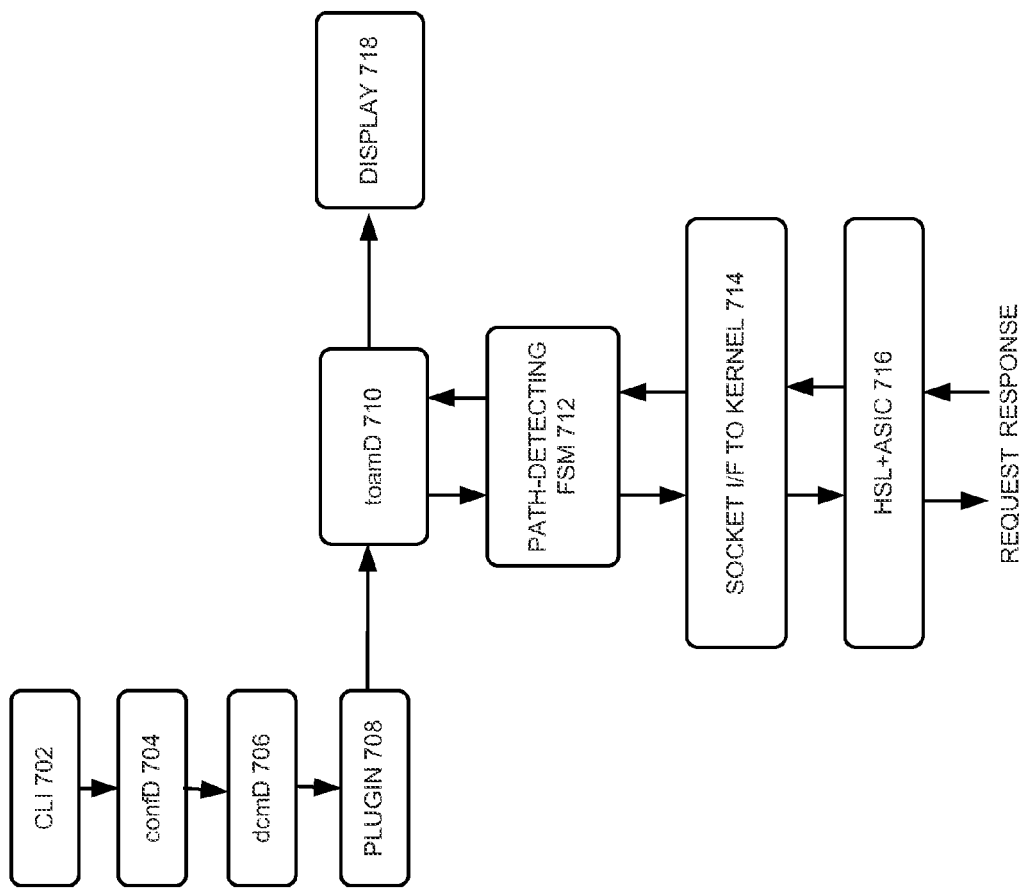
FIG. 7A presents a diagram illustrating the detailed flow of the path-detecting request and response packets within a TRILL network node that initializes the path-detecting operation in accordance with an embodiment of the present invention.

FIG. 7A presents a diagram illustrating the detailed flow of the path-detecting request and response packets within a TRILL network node that initializes the path-detecting operation in accordance with an embodiment of the present invention. During operation, a path-detecting request command is executed via a CLI module 702 running on a processor, invoking a configuration background process (also called a daemon) confD 704 developed by the Tail-f Systems of Round Hill, Va. ConfD 704 in turn executes the command based on a predetermined set of rules. The confD-Gateway (a plugin within the confD daemon) does the translation, creates a message, and dispatches it to a WAVE daemon, dcmD 706 developed by Brocade Communications Systems of San Jose, Calif. In dcmD 706, a plugin 708, specific to that command, is invoked to validate the data that has been entered. Plugin 708 then sends a message to a TRILL OAM daemon, toamD 710, which runs in the user space, to execute the path-detecting request. A path-detecting finite state machine (FSM) 712 creates a path-detecting request packet, starts a timer, and communicates with the kernel via a socket interface 714 using a newly created socket family, such as AF_TOAM or AF_PACKET. The created request packet makes its way through the high-speed-link (HSL) module and the application-specific integrated circuit (ASIC) driver 716, and then goes out on the wire. When a path-detecting response packet is received, it gets to the kernel via HSL module and ASIC driver 716, and then the response packet reaches path-detecting FSM 712 running in toamD 710 via socket interface 714. The path-detecting response packet is processed by toamD 710, and if needed, a new request packet is generated with an incremented TTL value. The new request packet is then sent out on the wire. The system then waits for the response to the new request packet to arrive. These operations repeat until the destination node is reached. The received responses are sent to display 718 sequentially.

FIG. 7B presents a diagram illustrating the detailed flow of the path-detecting request and response packets within a TRILL network node that responds to the path-detecting request in accordance with an embodiment of the present invention. During operation, an intermediate node or the destination node of the path-detecting request receives a path-detecting request packet, which makes its way to the kernel via HSL module and ASIC driver 716. The request packet then reaches toamD 710 via socket interface 714. ToamD 710 processes the received request packet and generates a request for routing entries to the destination node. In one embodiment, the routing-entry request is made via an ioctl() function call to HSL module and ASIC driver 716. HSL module and ASIC driver 716 responds to the function call with the routing information sent to toamD 710, which in turn constructs a path-detecting response packet using the routing information. The response packet is sent to the kernel via socket interface 714. Subsequently, the response packet is sent out on the wire via HSL module and ASIC driver 716.

This option generates and processes path-detecting request and response packets using a daemon (toamD) running in the user space. Such an approach makes debugging easier. However, a new daemon needs to be invoked, and communication is needed between the dcmD plugin specified for the path-detecting command and the newly invoked daemon; such requirements occupy resources and increase system complexity.

Packet Flow Option 2

Figure 8B:
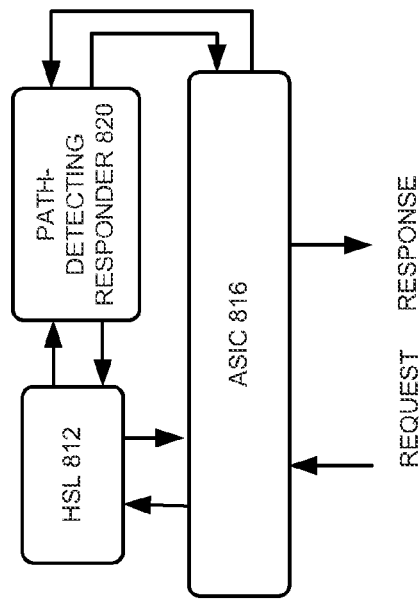
FIG. 8B presents a diagram illustrating the detailed flow of the path-detecting request and response packets within a TRILL network node that responds to the path-detecting request in accordance with an embodiment of the present invention.
Figure 8A:
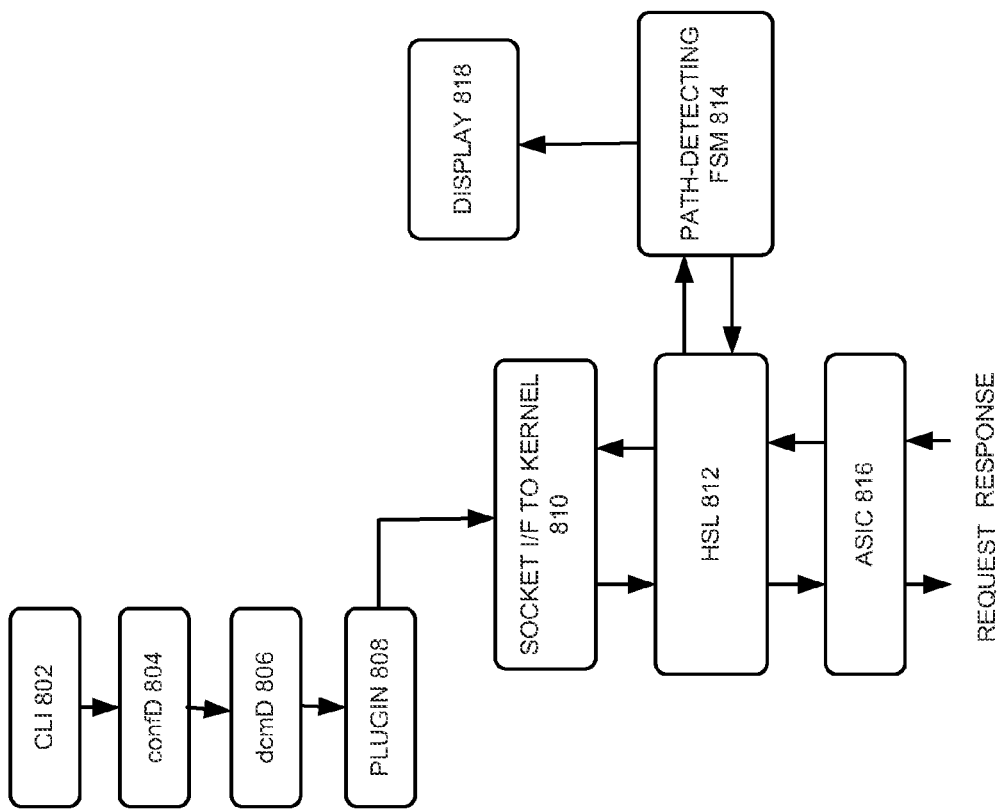
FIG. 8A presents a diagram illustrating the detailed flow of the path-detecting request and response packets within a TRILL network node that initializes the path-detecting operation in accordance with an embodiment of the present invention.

FIG. 8A presents a diagram illustrating the detailed flow of the path-detecting request and response packets within a TRILL network node that initializes the path-detecting operation in accordance with an embodiment of the present invention. During operation, a path-detecting request command is executed via a CLI module 802 running on a processor, invoking a configuration background process confD 804, which in turn executes the command based on a predetermined set of rules. The confD-Gateway does the translation, creates a message, and dispatches it to a WAVE daemon, dcmD 806. In dcmD 806, a plugin 808, specific to that command, is invoked to validate the data that has been entered. Plugin 808 invokes a worker thread, which runs in the user space, to execute the path-detecting request. The worker thread then communicates with the kernel via a socket interface 810 using a newly created socket family, such as AF_TOAM or AF_PACKET. The HSL module 812 in the kernel invokes path-detecting FSM 814, which generates the path-detecting request packet. The generated request packet makes its way through HSL module 812 and ASIC driver 816, and then goes out on the wire. When a path-detecting packet is received, it gets to ASIC driver 816 and HSL module 812 in the kernel. Subsequently, the response packet gets to path-detecting FSM 814, which processes the response, and if needed, a new request packet is generated with an incremented TTL value. The new request packet is then sent out on the wire. The system then waits for the response to the new request packet to arrive. These operations repeat until the destination node is reached. The received responses are sent to display 818 sequentially.

FIG. 8B presents a diagram illustrating the detailed flow of the path-detecting request and response packets within a TRILL network node that responds to the path-detecting request in accordance with an embodiment of the present invention. During operation, an intermediate node or the destination node of the path-detecting request receives a path-detecting request packet, which makes its way to HSL module 812 via ASIC driver 816. HSL module 812 then invokes a path-detecting responder module 820, which processes the request packet and generates a request for routing entries to the destination node. In one embodiment, the routing-entry request is made via an ioctl( ) function call to ASIC driver 816. ASIC driver 816 responds to the function call with the routing information sent to path-detecting responder 820, which in turn constructs a path-detecting response packet using the routing information. The response packet is sent to ASIC driver 816 via HSL module 812 before it goes out on the wire.

This option does not require a new daemon to be invoked because the operation is now in a worker thread within the dcmD plugin. However, generating the request and processing the response partially occur in the kernel space, which makes debugging more difficult.

Packet Flow Option 3

FIG. 9A presents a diagram illustrating the detailed flow of the path-detecting request and response packets within a TRILL network node that initializes the path-detecting operation in accordance with an embodiment of the present invention. During operation, a path-detecting request command is executed via a CLI module 902, running on a processor to invoke a configuration background process (also called a daemon) confD 904, which in turn executes the command based on a predetermined set of rules. The confD-Gateway does the translation, creates a message, and dispatches it to a WAVE daemon, dcmD 906. In dcmD 906, a plugin 908, specific to that command, is invoked to validate the data that has been entered. Plugin 908 invokes a worker thread, which runs in the user space, to execute the path-detecting request by invoking a path-detecting FSM 910. Path-detecting FSM 910 creates the path-detecting request packet, starts a timer, and communicates with the kernel via a socket interface 912 using a newly created socket family, such as AF_TOAM or AF_PACKET. The created request packet makes its way through HSL module and ASIC driver 914, and then goes out on the wire. When a path-detecting response packet is received, it goes through HSL module and ASIC driver 914 in the kernel. Subsequently, the response packet gets to path-detecting FSM 910 via socket interface 912. Path-detecting FSM 910 processes the response, and if needed, a new request packet is generated with an incremented TTL value. The new request packet is then sent out on the wire. The system then waits for the response to the new request packet to arrive. These operations repeat until the destination node is reached. The received responses are sent to display 916 sequentially.

FIG. 9B presents a diagram illustrating the detailed flow of the path-detecting request and response packets within a TRILL network node that responds to the path-detecting request in accordance with an embodiment of the present invention. During operation, an intermediate node or the destination node of the path-detecting request receives a path-detecting request packet, which makes it way to HSL module and ASIC driver 914. Through socket interface 912, the request packet arrives at a path-detecting responder module 918, which processes the request packet and generates a request for routing entries to a routing database 920. Routing database 920 responds the routing request with the routing information, which is then used by path-detecting responder 918 to construct a path-detecting response packet. The response packet then goes out on the wire via HSL module and ASIC driver 914.

This option integrates the advantages of both previous options. No additional daemon is needed as the process runs in the dcmD context, and debugging is easier as the process is running in the user space.

Path-Detecting FSM

Figure 10:
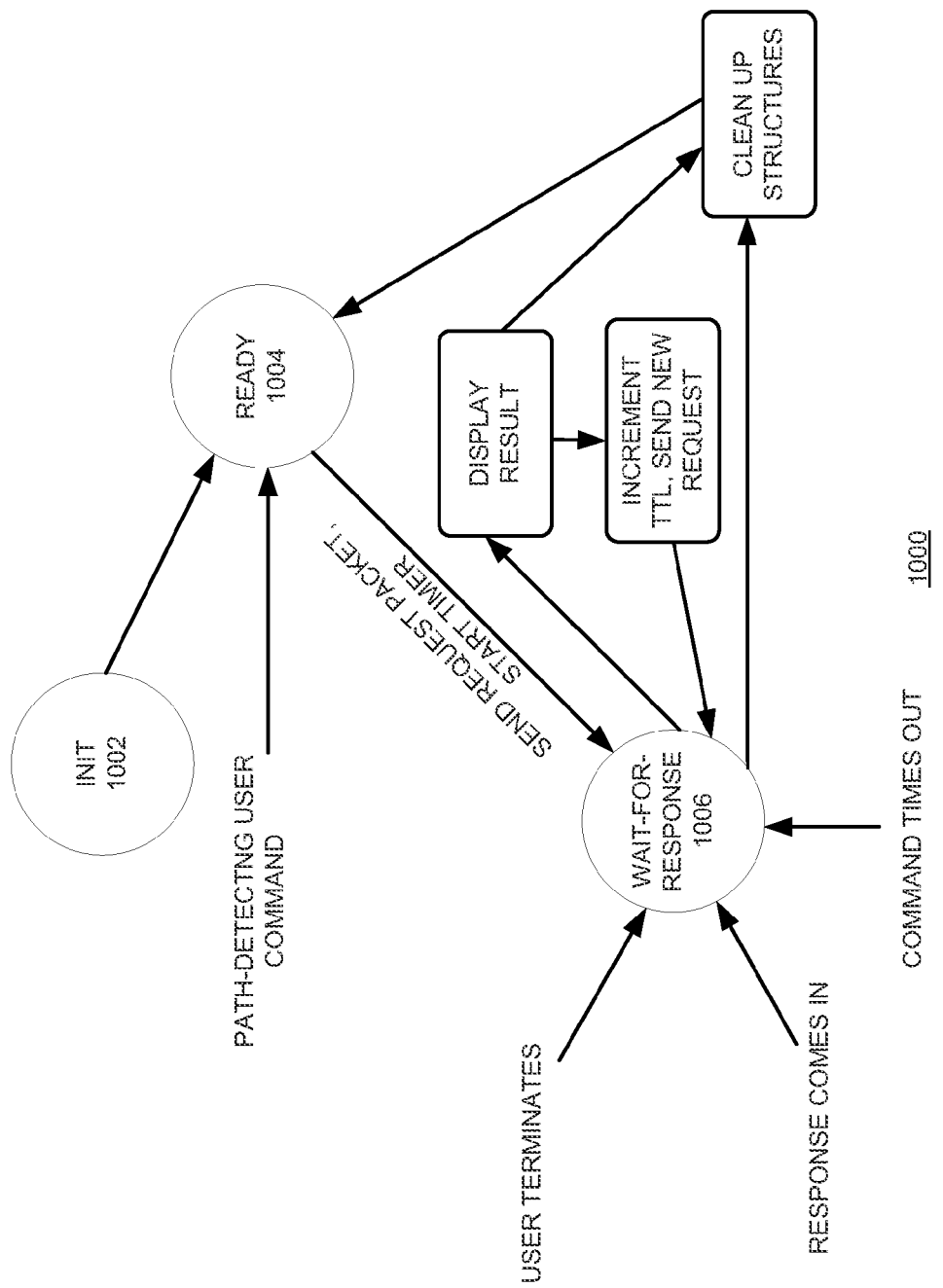
FIG. 10 presents a state diagram of an exemplary path-detecting finite state machine (FSM) in accordance with an embodiment of the present invention.

FIG. 10 presents a state diagram of an exemplary path-detecting finite state machine (FSM) in accordance with an embodiment of the present invention. Path-detecting FSM 1000 includes three states: initial state 1002, ready state 1004, and wait-for-response state 1006.

After system initialization, FSM 1000 moves from initial state 1002 to ready state 1004. During operation, a path-detecting request user command causes FSM 1000 to move from ready state 1004 to wait-for-response state 1006. Valid events in wait-for-response state 1006 include user termination, arrival of a response, and command times out. These valid responses cause the system to display the path-detecting result. If there is a need to send a new request, the system increments the TTL value, sends the new request, and returns to wait-for-response state 1006. If there is no need to send a new request, the system cleans up data structures, and returns to ready state 1004. On the other hand, an invalid event will also cause the system to clean up the data structure, and return to ready state 1004. Note that at any given time a number of simultaneous path-detecting requests can exist as long as the number does not exceed a predetermined threshold. To implement FSM 1000, the system can allocate individual data blocks, each representing the states and other aspects of a path-detecting request.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
    transmitting a network-testing request frame, which includes a time-to-live (TTL) field within a Transparent Interconnection of Lots of Links (TRILL) header, from a source node to a destination node;
    in response to receiving a network-testing response frame sent from an intermediate node, incrementing a value of the TTL field within the TRILL header by 1 and re-transmitting the network-testing request frame to the destination node; and
    in response to receiving another network-testing response frame sent from the destination node, determining a path between the source node and the destination node;
    wherein the network-testing request frame or the network-testing response frame is not processed on an Internet Protocol (IP) layer.

2. The method of claim 1, wherein the network-testing request frame or the network-testing response frame includes an Ethernet frame.

3. The method of claim 2, wherein the Ethernet frame includes a field which indicates that the Ethernet frame is an Operation, Administration, and Management (OAM) frame.

4. The method of claim 1, further comprising executing a network-testing command which includes an address of the destination node.

5. The method of claim 1, wherein the network-testing request frame or the network-testing response frame is a TRILL frame.

6. The method of claim 5, wherein the network-testing request frame or the network-testing response frame includes the TRILL header comprising an address of the destination node in an outer media access control (MAC) destination address (DA) field.

7. The method of claim 5, wherein the network-testing request frame or the network-testing response frame includes the TRILL header and an encapsulated Ethernet frame, and wherein an Ethertype field of the encapsulated Ethernet frame specifies that the network-testing request frame or the network-testing response frame is a TRILL OAM frame.

8. The method of claim 7, wherein the encapsulated Ethernet frame includes a TRILL OAM header field.

9. The method of claim 8, wherein the TRILL OAM header field includes an operation code (opcode) field, and wherein the opcode field specifies whether the TRILL OAM frame is the network-testing request frame or the network-testing response frame.

10. The method of claim 8, wherein the TRILL OAM header field includes a transaction identifier, and wherein the network-testing request frame and the corresponding network-testing response frame have the same transaction identifier.

11. The method of claim 8, wherein the TRILL OAM header field includes a flag field, and wherein the flag field of the network-testing response frame can be encoded to indicate whether the network-testing response frame is sent from the intermediate node or the destination node.

12. The method of claim 1, wherein the network-testing response frame sent from the intermediate node includes route information to a next hop, and wherein the route information includes an address and a port number of the next hop.

13. The method of claim 1, wherein the network-testing response frame or the network-testing request frame is transmitted as a payload of an Internet Protocol (IP) packet or a Fibre Channel over Ethernet (FCoE) packet, wherein the network-testing response frame or the network-testing request frame includes an inner Ethernet MAC frame, and wherein an Ethertype field within the inner Ethernet MAC frame is set as IP or FCoE.

14. The method of claim 13, wherein the Ethertype field is set as IP, and wherein the network-testing response frame or the network-testing request frame is included in a payload of a transmission control protocol (TCP) frame or a user datagram protocol (UDP) frame.

15. The method of claim 13, wherein the Ethertype field is set as FCoE, and wherein the network-testing response frame or the network-testing request frame is included in a payload of the FCoE frame.

16. A switch, comprising:
a request-transmission mechanism configured to transmit a network-testing request frame, which includes a time-to-live (TTL) field within a Transparent Interconnection of Lots of Links (TRILL) header, from a source node to a destination node;
a mechanism configured to, in response to receiving a network-testing response frame sent from an intermediate node, increment a value of the TTL field within the TRILL header by 1 and re-transmitting the network-testing request frame to the destination node; and
a determination mechanism configured to, in response to receiving another network-testing response frame sent from the destination node, determine a path between the source node and the destination node;
wherein the network-testing request frame or the network-testing response frame is not processed on an Internet Protocol (IP) layer.

17. The switch of claim 16, wherein the network-testing request frame or the network-testing response frame includes an Ethernet frame.

18. The switch of claim 17, wherein the Ethernet frame includes a field which indicates that the Ethernet frame is an Operation, Administration, and Management (OAM) frame.

19. The switch of claim 16, further comprising a command-execution mechanism configured to execute a network-testing command which includes an address of the destination node.

20. The switch of claim 16, wherein the network-testing request frame or the network-testing response frame is a TRILL frame.

21. The switch of claim 20, wherein the network-testing request frame or the network-testing response frame includes the TRILL header comprising an address of the destination node in an outer media access control (MAC) destination address (DA) field.

22. The switch of claim 20, wherein the network-testing request frame or the network-testing response frame includes the TRILL header and an encapsulated Ethernet frame, and wherein an Ethertype field of the encapsulated Ethernet frame specifies that the network-testing request frame or the network-testing response frame is a TRILL OAM frame.

23. The switch of claim 22, wherein the encapsulated Ethernet frame includes a TRILL OAM header field.

24. The switch of claim 23, wherein the TRILL OAM header field includes an operation code (opcode) field, and wherein the opcode field specifies whether the TRILL OAM frame is a network-testing request frame or a network-testing response frame.

25. The switch of claim 23, wherein the TRILL OAM header field includes a transaction identifier, and wherein the network-testing request frame and the corresponding network-testing response frame have the same transaction identifier.

26. The switch of claim 23, wherein the TRILL OAM header field includes a flag field, and wherein the flag field of the network-testing response frame can be encoded to indicate whether the network-testing response frame is sent from an intermediate node or the destination node.

27. The switch of claim 16, wherein the network-testing response frame sent from the intermediate node includes route information to a next hop, and wherein the route information includes an address and a port number of the next hop.

28. The switch of claim 16, wherein the network-testing response frame or the network-testing request frame is transmitted as a payload of an Internet Protocol (IP) packet or a Fibre Channel over Ethernet (FCoE) packet, wherein the network-testing response frame or the network-testing request frame includes an inner Ethernet MAC frame, and wherein an Ethertype field within the inner Ethernet MAC frame is set as IP or FCoE.

29. The switch of claim 28, wherein the Ethertype field is set as IP, and wherein the network-testing response frame or the network-testing request frame is included in a payload of a TCP frame or a UDP frame.

30. The switch of claim 28, wherein the Ethertype field is set as FCoE, and wherein the network-testing response frame or the network-testing request frame is included in a payload of the TCP or UDP frame.

31. An apparatus, comprising:
- means for transmitting a network-testing request frame, which includes a time-to-live (TTL) field within a Transparent Interconnection of Lots of Links (TRILL) header, from a source node to a destination node;
- means for, in response to receiving a network-testing response frame sent from an intermediate node, incrementing a value of the TTL field within the TRILL header by 1 and re-transmitting the network-testing frame to the destination node; and
- means for, in response to receiving another network-testing response frame sent from the destination node, determining a path between the source node and the destination node;
- wherein the network-testing request frame or the network-testing response frame is not processed on an Internet Protocol (IP) layer.

* * * * *